Sept. 19, 1933.         O. L. HERRON         1,927,034

WINDSHIELD

Filed Sept. 12, 1931

INVENTOR
Ollie L. Herron.
BY
ATTORNEYS.

Patented Sept. 19, 1933

1,927,034

UNITED STATES PATENT OFFICE 1,927,034

WINDSHIELD

Ollie L. Herron, Chicago, Ill., assignor of thirty per cent to Anna L. Herron, twenty per cent to Joseph B. Zimmers, and thirty per cent to Wilma M. Zimmers, all of Chicago, Ill.

Application September 12, 1931
Serial No. 562,495

6 Claims. (Cl. 296—84)

The invention relates to windshields and it has particular relation to windshields of the transparent type used on motor vehicles and the like.

The principal objects of the invention are to provide an auxiliary shield for the main windshield, which will eliminate condensing of moisture and frost that ordinarily form on the inner surface of the glass and impair vision therethrough; to provide an improved auxiliary shield for this purpose which has sealing means of resilient character, that cause the creation of a partial vacuum between the main shield and the auxiliary shield, when the latter is pressed against the former; to provide an auxiliary shield of the above mentioned character which can be moved into an out of the way position and against the roof of the vehicle when it is not in use; and to provide means for readily separating the auxiliary shield from the main shield, by initially admitting air into the space between the shields and consequently destroying the partial vacuum.

For a better understanding of the invention, reference may be had to the accompanying drawing forming a part of the specification wherein, Figure 1 is a fragmentary view of a motor vehicle, illustrating a windshield constructed according to one form of the invention;

Figure 1:
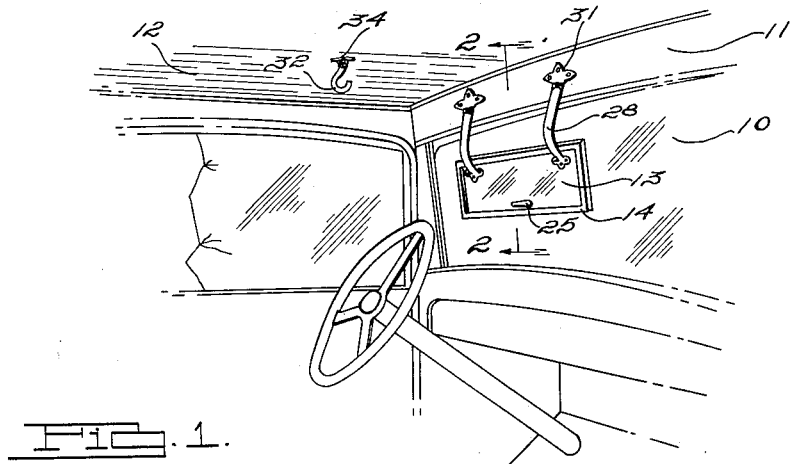
Figures 2, 5:
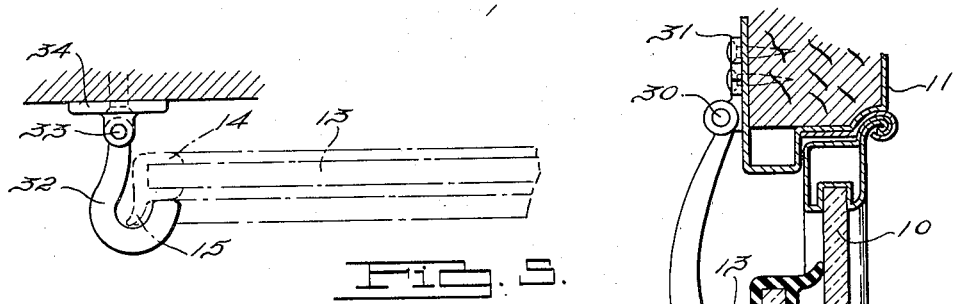
Fig. 2 is a cross sectional view on a larger scale, taken substantially along line 2—2 of Fig. 1.
Fig. 5 is a fragmentary cross sectional view of the roof of the vehicle, illustrating the manner in which the auxiliary shield is maintained against the roof and in an out of the way position when not in use.
Figure 3:
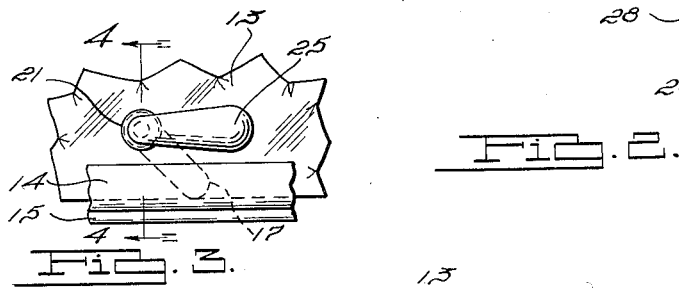
Fig. 3 is a fragmentary view illustrating the means employed for destroying the partial vacuum between the main shield and the auxiliary shield.
Figure 4:
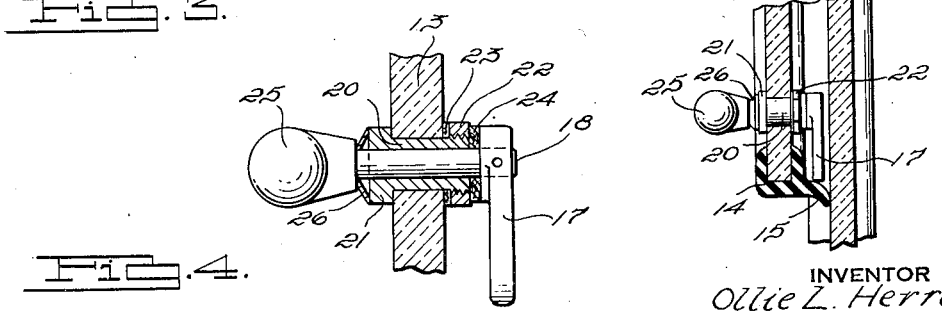
Fig. 4 is a cross sectional view on a larger scale, taken substantially along line 4—4 of Fig. 3.

Referring to Fig. 1 the main windshield of the vehicle is indicated at 10 and a vehicle frame member extending transversely above the windshield is indicated at 11. The roof of the vehicle is indicated at 12. Referring now to Fig. 2, an auxiliary glass shield 13 is provided, which has a channel shaped sealing member 14 extending around its edge with the legs of the channel embracing opposite side surfaces of the glass. The sealing member 14 may be constructed of rubber or any other suitable resilient sealing material and is provided with a flexible, outwardly flared flange 15 that extends from that side of the shield adjacent the main shield 10. When the auxiliary shield is pressed against the main shield, the flange 15 will be deflected outwardly from the edges of the auxiliary shield, and during such movement of the latter, air between the shields will be forced from this space and between the flange 15 and the main shield. Upon releasing the auxiliary shield, the natural resiliency of the flange 15 moves the auxiliary shield slightly away from the main shield, and causes a partial vacuum between the shields or in other words reduces the pressure of the air therebetween. In view of the fact that the pressure on the outer side of the auxiliary shield is then greater, the shield tends to maintain its position and ordinarily it is more or less difficult to remove it manually. For facilitating removal of the auxiliary shield, an arm 17 is provided at that side of the auxiliary shield adjacent the main shield, which is rigidly fastened to a pin 18 extending through the auxiliary shield. The pin 18 extends through a sleeve 20 located in an opening in the glass, and the sleeve is maintained in position by means of a collar 21 at its outer end, and a nut on its inner end which engages a sealing gasket 23 disposed between the nut and the inner surface of the glass. A second sealing element 24 is disposed between the arm 17 and the adjacent end of the sleeve. A handle 25 on the outer end of the pin serves to manipulate the arm 17 and between the arm and sleeve a resilient spring element 26 is provided for insuring a tight connection between the parts. Any other suitable sealing arrangement may be provided as long as the opening in the glass is sealed against the escape of air therethrough.

The arm 17 preferably is located near the lower edge of the auxiliary shield, and is of such length that when the handle 25 is manipulated, the free end of the arm will engage the flange 15 at one point and separate it from the shield 10. As soon as this occurs air will enter into the space thus created between the flange and the shield and the pressure between the shield will automatically become equal to the pressure on the outer side of the shield 13. Then the shield 13 may be readily moved away from the shield 10.

The shield 13 is mounted on an arm 28 by means of suitable fastening elements 29 passing through a bracket on the end of the arm, and the arm is pivotally mounted on a pin 30 forming part of a hinge connection 31 fastened to the vehicle frame member 11 above the windshield. When the auxiliary shield is moved into its inoperative position against the roof 12, it is maintained in such position by means of a hook 32 which is pivotally connected as indicated at 33, to a bracket 34 fastened to the roof. This hook engages an edge of the auxiliary shield, and it will be noted that the flange 15 normally will prevent separation of the hook from its engaging relation with the shield.

The auxiliary shield is so positioned in the vehicle that when moved into its operative position against the main shield, the line of vision of the driver of the vehicle will pass therethrough. The air pocket between the shields will effectively prevent condensation of moisture and frost, and consequently vision through the windshield will not be impaired in the area covered by the auxiliary shield.

The auxiliary shield can readily be attached to any vehicle for cooperation with the windshield used on motor vehicles and can be constructed inexpensively. Moreover, it may be removed instead of being disposed in an out of the way position against the roof and this may be desired particularly in warmer weather when the auxiliary shield is not necessary. The construction is very efficient in operation and manifestly will increase the safety with which motor vehicles may be operated.

Although only one form of the invention has been described and illustrated in detail it will be apparent to those skilled in the art that various modifications may be made without departing from the scope of the appended claims.

I claim:

1. A windshield comprising a main shield, an auxiliary shield located adjacent the main shield and having a resilient margin for sealing the space between the shields and creating a partial vacuum therebetween upon applying pressure to the auxiliary shield, and means for destroying the vacuum prior to moving the auxiliary shield, said means comprising a member for initially moving the resilient margin and breaking the seal at one point.

2. A windshield comprising a main shield, an auxiliary shield located adjacent the main shield and having a flexible, resilient margin for sealing the space between the shields and creating a partial vacuum therebetween upon applying pressure to the auxiliary shield, an arm pivotally secured to the inner side of the auxiliary shield, adjacent to and engageable with the sealing element, and operating means extending through the latter shield and connected to the arm, whereby upon moving the arm, the latter will break the seal and destroy the partial vacuum.

3. A windshield comprising a main shield, an auxiliary shield located adjacent the main shield and having a flexible, resilient margin for sealing the space between the shields and creating a partial vacuum therebetween upon applying pressure to the auxiliary shield, means disposed between the shields and movable parallel to the plane thereof for moving the resilient margin outwardly to break the seal, and means operatively connected to the seal breaking means and accessible to the exterior of the auxiliary shield for operating said seal breaking means.

4. A windshield comprising a main shield, an auxiliary shield located adjacent the main shield and having a flexible, resilient margin for sealing the space between the shields and creating a partial vacuum therebetween upon applying pressure to the auxiliary shield, and means for moving the resilient margin outwardly and away from the main shield at one point, to break the seal when it is desired to move the auxiliary shield away from such main shield.

5. A windshield comprising a main shield, an auxiliary shield located adjacent the main shield and having a flexible, resilient margin for sealing the space between the shields and creating a partial vacuum therebetween upon applying pressure to the auxiliary shield, and means disposed between the shields and within the resilient margin, for moving such margin away from the main shield at one point to break the seal.

6. A windshield comprising a main shield, an auxiliary shield located adjacent the main shield and having a flexible, resilient margin for sealing the space between the shields and creating a partial vacuum therebetween upon applying pressure to the auxiliary shield, means disposed between the shields and within the resilient margin for moving such margin away from the main shield at one point to break the seal and hence destroy the partial vacuum, and operating means operatively connected to said seal breaking means and operable from a point exterior to the auxiliary shield.

OLLIE L. HERRON.